US011336751B2

(12) United States Patent
Lange et al.

(10) Patent No.: US 11,336,751 B2
(45) Date of Patent: May 17, 2022

(54) METHOD FOR OPERATING A FIELDBUS SYSTEM AND GATEWAY

(71) Applicant: Lenze Automation GmbH, Aerzen (DE)

(72) Inventors: Andre Lange, Huellhorst (DE); Sebastian Luelsdorf, Helpsen (DE)

(73) Assignee: Lenze Automation GmbH, Aerzen (DE)

( * ) Notice: Subject to any disclaimer, the term of this patent is extended or adjusted under 35 U.S.C. 154(b) by 270 days.

(21) Appl. No.: 16/112,196

(22) Filed: Aug. 24, 2018

(65) Prior Publication Data
US 2019/0068758 A1 Feb. 28, 2019

(30) Foreign Application Priority Data
Aug. 25, 2017 (DE) ................... 10 2017 214 894.2

(51) Int. Cl.
*H04L 69/08* (2022.01)
*H04L 67/12* (2022.01)
(Continued)

(52) U.S. Cl.
CPC ........ *H04L 69/08* (2013.01); *H04L 12/40169* (2013.01); *H04L 12/66* (2013.01);
(Continued)

(58) Field of Classification Search
CPC ... H04L 69/08; H04L 12/40169; H04L 12/66; H04L 61/251; H04L 61/2514;
(Continued)

(56) References Cited

U.S. PATENT DOCUMENTS

2009/0175284 A1\* 7/2009 Fujisawa ........... H04L 29/12358
370/401
2012/0036514 A1\* 2/2012 Master ..................... G06F 9/38
718/104
(Continued)

OTHER PUBLICATIONS

International Electrotechnical Commission, IEC 61158-1:2019, Industrial Communication Networks—Fieldbus Specifications—Part 1: Overview and Guidance for the IEC 61158 and IEC 61784 Series 1-4 (https://webstore.iec.ch/publication/59890) (last visited Sep. 14, 2021).\*

*Primary Examiner* — Hardikkumar D Patel
(74) *Attorney, Agent, or Firm* — Crowell & Moring LLP

(57) ABSTRACT

A method operates a field bus system, wherein the field bus system has: a gateway, which has a network connection for a network of a specified type and a fieldbus connection for a fieldbus, and a number of fieldbus nodes, wherein the fieldbus nodes are coupled to each other and to the gateway via the fieldbus for the purpose of data exchange. Addressing takes place in the network of the specified type by network addresses, wherein the network addresses have a first part which designates a destination address, and a second part which designates a port of the destination address. The method comprises the steps of: creating a bus configuration, wherein the bus configuration assigns a destination address to a port, and performing a network address translation using the gateway based on the bus configuration created.

10 Claims, 1 Drawing Sheet

(51) Int. Cl.
*H04L 61/2517* (2022.01)
*H04L 61/2514* (2022.01)
*H04L 12/40* (2006.01)
*H04L 12/66* (2006.01)
*H04L 61/251* (2022.01)

(52) U.S. Cl.
CPC ........ *H04L 61/251* (2013.01); *H04L 61/2514* (2013.01); *H04L 61/2517* (2013.01); *H04L 67/12* (2013.01)

(58) Field of Classification Search
CPC ..... H04L 61/2517; H04L 67/12; H04L 12/40; H04L 12/4625; H04L 2012/4026; H04L 41/22; H04L 67/10; H04L 12/403; H04L 12/4641; H04L 69/16; H04L 29/12358; G06F 13/20; G06F 40/40; G06F 13/362; G06F 13/4286; G05B 19/0426; G05B 19/056; G05B 19/41845; G05B 2219/25428; G05B 2219/31121; G05B 2219/31132; G05B 2219/32144; G05B 2219/31348; Y02P 90/02

See application file for complete search history.

(56) References Cited

U.S. PATENT DOCUMENTS

| | | | | |
|---|---|---|---|---|
| 2012/0102240 A1* | 4/2012 | Wei | ....................... | H04L 12/403 710/30 |
| 2013/0301650 A1* | 11/2013 | Zou | ..................... | H04L 61/2557 370/467 |
| 2015/0063167 A1* | 3/2015 | Yoo | ..................... | H04L 12/4625 370/254 |

* cited by examiner

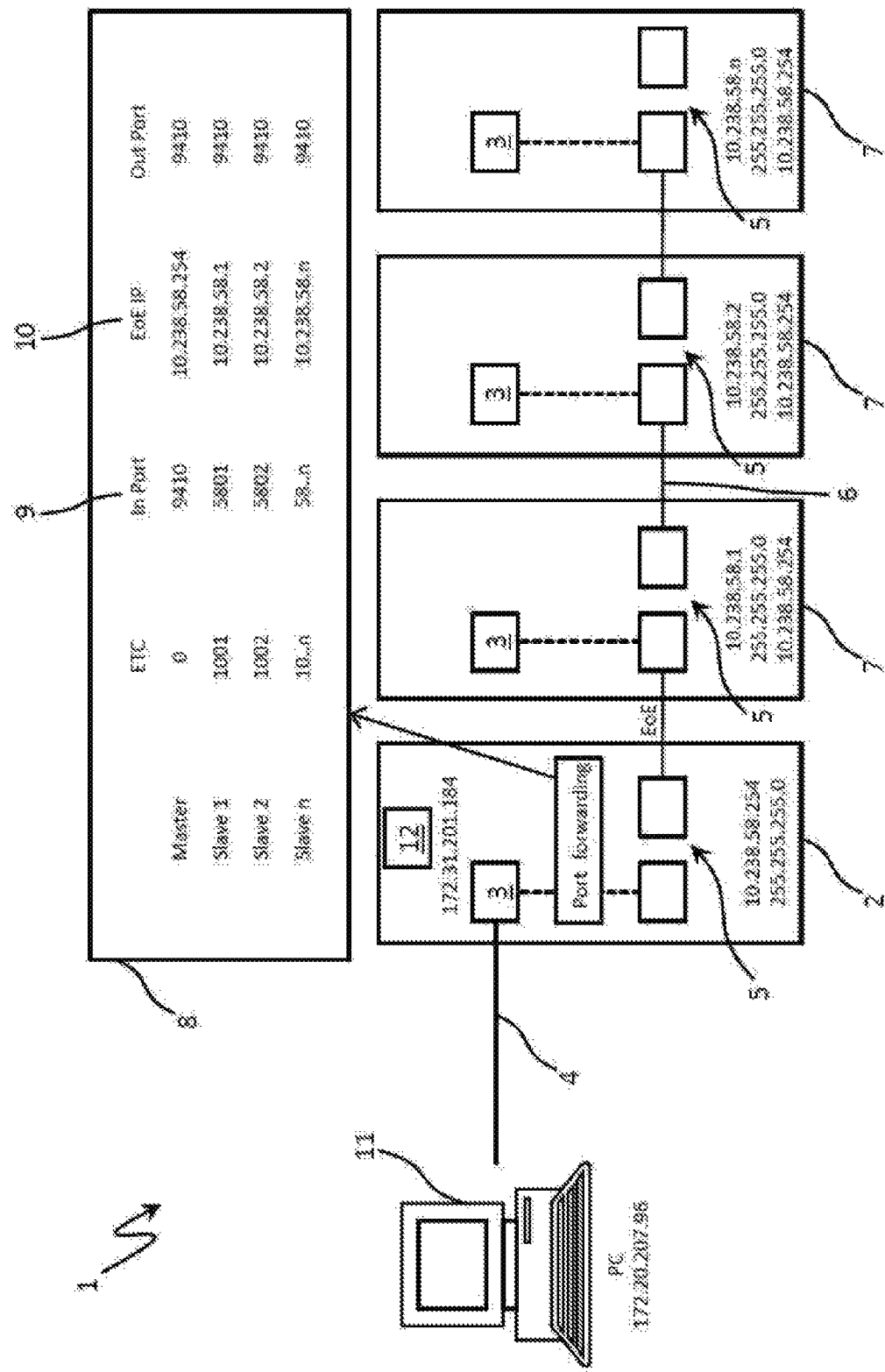

METHOD FOR OPERATING A FIELDBUS SYSTEM AND GATEWAY

CROSS REFERENCE TO RELATED APPLICATION

This application claims priority under 35 U.S.C. § 119 from German Patent Application No. 10 2017 214 894.2, filed Aug. 25, 2017, the entire disclosure of which is herein expressly incorporated by reference.

BACKGROUND AND SUMMARY OF THE INVENTION

The invention relates to a method for operating a fieldbus system and a gateway.

The object of the invention is to provide a method for operating a fieldbus system, and a gateway, which enable a simple and secure communication between fieldbus-external and fieldbus-internal nodes.

The invention achieves this object by a method for operating a fieldbus system wherein the fieldbus system comprises a gateway, which has a network connection for a network of a specified type and a fieldbus connection for a fieldbus, and a number of fieldbus nodes. The fieldbus nodes are coupled to each other and to the gateway via the fieldbus for the purpose of data exchange. Addressing takes place in the network of the specified type by way of network addresses. The network addresses have a first part which designates a destination address, and a second part which designates a port of the destination address. The method comprises the steps of: creating a bus configuration, wherein the bus configuration assigns a destination address to a port; and performing a network address translation using the gateway based on the bus configuration created.

The invention also achieves this object by a gateway, comprising: a network connection for a network of a specified type; a fieldbus connection for a fieldbus; and a control unit, which is configured to carry out a network address translation based on a bus configuration.

The method is used for operating a fieldbus system.

The fieldbus system has a gateway which has at least one network connection for a network of a specified type, and at least one fieldbus connection for a fieldbus. The gateway forms a component (hardware and/or software), which establishes a (data) connection between the network of the specified type and the fieldbus, wherein the gateway transfers data bidirectionally between the network of the specified type and the fieldbus. This applies to data in all layers of the OSI model. For further information with regard to the basic functions of gateways, reference is also made to the relevant specialist literature.

The fieldbus system further comprises a number (for example, between 1 and 100) of fieldbus nodes, wherein the fieldbus nodes are coupled to each other and to the gateway via the fieldbus for the purpose of data exchange.

In addition to its gateway function, the gateway can have the function of a fieldbus master, wherein the fieldbus nodes form fieldbus slaves. With regard to the basic functions of the fieldbus master and the fieldbus slave, reference is made to the relevant specialist literature.

An addressing takes place in the network of the specified type based on network addresses, wherein the network addresses have a first part which designates a destination address, and a second part which designates a port, or port number, of the destination address. The destination address can be, for example, an IP address and the port can, for example, implement an assignment of TCP and UDP connections and TCP and UDP data packets to server and client programs. Each connection of these two protocols can include two ports, one on the client side and one on the server side. For further details, reference is also made to the relevant specialist literature.

The method comprises the following steps.

Firstly, a bus configuration is created, wherein the bus configuration assigns ports to destination addresses. The bus configuration can of course include additional information. For example, a port can be assigned to a fieldbus node, wherein the destination address is then in turn assigned to the port. The bus configuration can be created by a user, for example by means of a tool, during the configuration of the fieldbus system, wherein the bus configuration is saved as a file which is accessible to the gateway and optionally, to additional nodes of the fieldbus.

After creating or defining the bus configuration, the gateway carries out a network address translation (NAT) based on the bus configuration created. In the network address translation, address information items in data packets are replaced by others in an automated manner based on the bus configuration, in order to connect the network of the specified type to the fieldbus. The gateway can perform, for example, a source NAT and/or a destination NAT.

According to one embodiment, performing the network address translation using the gateway based on the created bus configuration comprises the following steps carried out by means of the gateway:

receiving a data packet, which is addressed to the gateway, via the network connection for the network of the specified type. The data packet can originate, for example, from a diagnostic and/or commissioning device which addresses the gateway, wherein for example, the IP address of the gateway is used as the destination address in the network address used, and to determine a specific fieldbus node a port of the network address assigned to said node is used. The diagnostic and/or commissioning device typically uses the previously created bus configuration for this purpose, in which the port↔fieldbus node mappings can be defined. The gateway then extracts the port from the network address contained in the received data packet and replaces the destination address in the received data packet with the destination address that is assigned to the extracted port in the bus configuration. Finally, the gateway forwards the data packet thus processed via its fieldbus connection to the fieldbus node that has the destination address of the processed data packet. For data transmission in the other direction the gateway can implement corresponding mechanisms.

According to one embodiment, the network connection for the network of the specified type is an Ethernet connection.

According to one embodiment, the fieldbus is an EtherCAT fieldbus.

According to one embodiment, the destination address is an IPv4 address or IPv6 address.

According to one embodiment, the processed data packet is forwarded or transmitted via the fieldbus connection of the gateway to the fieldbus node that has the destination address of the processed data packet by means of an Ethernet over EtherCAT (EoE) protocol.

According to one embodiment, the fieldbus system has a diagnostic and/or commissioning device which is coupled to the gateway via the network of the specified type for the purpose of data exchange, wherein the diagnostic and/or commissioning device exchanges data with the fieldbus nodes via the gateway.

According to one embodiment, the bus configuration is created by an operator, for example a technician, who can use, for example, a suitable software tool for this purpose, for example the diagnostic and/or commissioning device.

According to one embodiment, the diagnostic and/or commissioning device is designed to determine a port from a fieldbus-specific address, specified for example by a user, and to send this to the gateway as part of a data packet or of a network address of the data packet. For example, a user can establish a connection to a fieldbus node by specifying the address of the network connection of the gateway, which is known to the user, and the fieldbus-specific address of the slave, which is also known. From these, the diagnostic and/or commissioning device automatically generates a network address with an associated port number. The port numbers are also transparent to the user in this case, i.e. he/she does not need to know them.

The gateway according to the invention has the network connection for the network of the specified type, the fieldbus connection for the fieldbus, and a control unit that is designed to perform the network address translation based on the bus configuration.

Within a fieldbus system with fieldbus nodes coupled via a fieldbus, such as EtherCAT, there is typically a requirement to access the fieldbus nodes from a diagnostic and/or commissioning device, for example in the form of an engineering PC. Typically, a connection between the diagnostic and/or commissioning device and the fieldbus nodes is most commonly made via Ethernet, as many client programs use TCP-IP protocols. It is desirable in this context to be able to reach all fieldbus nodes or slaves via a central access point, for example, the master device of the fieldbus system. To this end, according to the invention, there is a gateway in the master device between the Ethernet port and the fieldbus, for example an EtherCAT fieldbus.

The EtherCAT fieldbus supports the Ethernet over EtherCAT (EoE) protocol, in which Ethernet frames can be exchanged between the master device and the fieldbus nodes or slaves within the EtherCAT communication. The master and the fieldbus nodes or slaves receive an IP address valid for the EoE network from the bus configuration.

The core of the invention is then how the slaves of devices on the Ethernet side or non-fieldbus side of the master device or gateway can be addressed, i.e., how the gateway between the Ethernet network and the EtherCAT network is configured.

In order to keep the subordinate EoE network transparent, according to the invention the well-known port forwarding technique is used. According to the invention, the required port-forwarding table is generated dynamically from the (EtherCAT) bus configuration. According to the invention, the ports are transparent to a user, i.e. he/she does not assign them explicitly, but the gateway automatically activates the required number of ports from a fixed supply of ports on the basis of the existing bus configuration.

For each required service (gci, ssh, etc.) a dedicated port range can be provided. Within this port range a specific port is then assigned for each fieldbus node or slave, and this is associated with the destination address of the fieldbus node or slave.

The effect of the invention is that the EoE network remains transparent. In addition, fieldbus nodes or slaves can be addressed in engineering tools via an associate port (for example, ordinal number plus offset). The engineering tools do not require knowledge of the IP address of the slaves. Therefore, no distribution of IP routing information in the network of the engineering tools is necessary either. Further, there is virtually no limit to the number of fieldbus nodes or slaves, since the ports are derived dynamically from the bus configuration (number of the EoE slaves).

It is self-evident that the invention is not limited to EtherCAT fieldbuses.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 a schematic representation of a fieldbus system with a diagnostic and/or commissioning device, a gateway and a number of fieldbus nodes.

DETAILED DESCRIPTION OF THE DRAWINGS

FIG. 1 shows a schematic representation of a fieldbus system 1 with a diagnostic and/or commissioning device 11, a gateway 2 and a number of fieldbus nodes 7.

The gateway 2 has a network connection 3 for an Ethernet network 4 and an EtherCAT fieldbus connection 5 for an EtherCAT fieldbus 6.

The fieldbus nodes 7 are coupled to each other and to the gateway 2 via the fieldbus 6 for the purpose of data exchange.

The diagnostic and/or commissioning device 11 is coupled to the gateway 2 over the Ethernet network 4 for the purpose of data exchange, wherein the diagnostic and/or commissioning device 11 exchanges data with the fieldbus nodes 7 via the gateway 2.

The gateway 2 forms the fieldbus master and the fieldbus nodes 7 form fieldbus slaves.

On the EtherCAT fieldbus 6, the Ethernet over EtherCAT (EoE) protocol is implemented.

By way of example the Ethernet network connection 3 of the gateway 2 is assigned the IP address "172.31.201.184". This IP address is used by the diagnostic and/or commissioning device 11 to communicate with the gateway 2. By way of example, the EtherCAT fieldbus connection 5 of the gateway 2 is assigned the IP address "10.238.58.254". The subnet mask is "255.255.255.0".

The fieldbus node 7 on the far left is assigned the example IP address "10.238.58.1" representative of the EoE network. The subnet mask is "255.255.255.0". The IP address of the gateway 2 is entered as the DNS server. With regard to the addresses of the other fieldbus nodes 7, reference is made to FIG. 1.

The addresses shown are shown in a bus configuration 8, which is organized in columns and rows.

The first, optional, column contains identifiers for the network nodes, i.e. "Master", "Slave 1", "Slave 2" and "Slave n".

The second column contains the corresponding ETC number, in this case by way of example the ETC number "0" for the master, the ETC number "1001" for slave 1, the ETC number "1002" for slave 2 and the ETC number "10..n" for slave n.

The third column contains the corresponding port (reference numeral 9), in the present case by way of example port "9410" for the master, the port "5801" for the slave 1, the port "5802" for the slave 2 and the port "58..n" for the slave n.

The fourth column assigns an EoE destination IP address (reference numeral 10) to a specific port, in the present case by way of example for the slave 1 or its port "5801" the EoE IP destination address "10.238.58.1", for the slave 2 or its port "5802" the EoE IP destination address "10.238.58.2" and for the slave n or its port "58..n" the EoE IP destination address "10.238.58.n". A corresponding entry for the master is not necessary since no port forwarding is performed for this.

The fifth, optional column designates an associated out port.

In accordance with the invention the known port-forwarding procedure is then used, wherein in accordance with the invention the port-forwarding table required in the gateway 2 for this purpose is generated dynamically from the (EtherCAT) bus configuration 8. The gateway or master 2 and the fieldbus nodes or slaves 7 receive an IP address valid for the EoE network from the bus configuration 8, as shown.

If the diagnostic and/or commissioning device 11 wants to communicate, for example, with the fieldbus node with the IP address "10.238.58.1", i.e. the slave 1, the diagnostic and/or commissioning device 11 sends a data packet with a network address which has the Ethernet IP address of the gateway "172.31.201.184" as the destination address and port "5801" as the port.

The gateway 2 receives the data packet on its Ethernet network connection 3 and extracts the port "5801" from the network address contained in the data packet. The gateway 2 then extracts the destination address "10.238.58.1" assigned to the port "5801" from the bus configuration 8 and replaces the destination address "172.31.201.184" in the received data packet by the new destination address "10.238.58.1". The gateway 2 then outputs the processed data packet at its fieldbus connection 5, so that this finally arrives at the "Slave 1" by means of the EoE protocol.

The address conversion and/or port forwarding procedure for data packets which are transmitted by the fieldbus nodes 7 in the direction of the diagnostic and/or commissioning device 11 can be carried out in the same way by, for example, the source address being replaced.

Different bus configurations can be used for different services.

It is self-evident that the fieldbus system can have more than one gateway, wherein in this case a specific bus configuration can be assigned to each gateway.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a fieldbus system, wherein the fieldbus system comprises:
a gateway, which has a network connection for a network of a specified type and a fieldbus connection for a fieldbus, and
a number of fieldbus nodes, wherein the fieldbus nodes are coupled to each other and to the gateway via the fieldbus for the purpose of data exchange,
wherein addressing takes place in the network of the specified type by way of network addresses, wherein the network addresses have a first part which designates a destination address, and a second part which designates a port of the destination address,
the method comprising the steps of:
creating a bus configuration, wherein the bus configuration assigns a destination address to a port; and
performing a network address translation using the gateway based on the bus configuration created.

2. The method as claimed in claim 1, wherein
performing the network address translation using the gateway based on the bus configuration created comprises the steps of:
receiving a data packet, which is addressed to the gateway, via the network connection for the network of the specified type;
extracting a port from a network address contained in the received data packet;
processing the received data packet by replacing the destination address contained in the received data packet by a destination address which is assigned to the extracted port in the bus configuration; and
forwarding the processed data packet via the fieldbus connection of the gateway to the fieldbus node which has the destination address of the processed data packet.

3. The method as claimed in claim 1, wherein
the network connection for the network of the specified type is an Ethernet connection.

4. The method as claimed in claim 1, wherein
the fieldbus is an EtherCAT fieldbus.

5. The method as claimed in claim 1, wherein
the destination address is an IPv4 address or IPv6 address.

6. The method as claimed in claim 2, wherein
the forwarding of the processed data packet via the fieldbus connection of the gateway to the fieldbus node that has the destination address of the processed data packet is performed by an Ethernet over EtherCAT protocol.

7. The method as claimed in claim 1, wherein
the fieldbus system further comprises:
a diagnostic and/or commissioning device which is coupled to the gateway over the network of the specified type for the purpose of data exchange, wherein the diagnostic and/or commissioning device exchanges data with the fieldbus nodes via the gateway.

8. The method as claimed in claim 7, wherein
the creation of the bus configuration is performed by the diagnostic and/or commissioning device.

9. The method as claimed in claim 7, wherein
the diagnostic and/or commissioning device is configured to determine a port from a fieldbus-specific address and to send said port to the gateway as part of a data packet.

10. A gateway, comprising:
a network connection for a network of a specified type;
a fieldbus connection for a fieldbus; and
a control unit, which is configured to carry out a network address translation based on a bus configuration.

* * * * *